(12) United States Patent
Wang et al.

(10) Patent No.: US 9,112,690 B2
(45) Date of Patent: *Aug. 18, 2015

(54) METHOD AND APPARATUS FOR MEDIUM ACCESS CONTROL IN-ORDER DELIVERY

(71) Applicant: INTERDIGITAL PATENT HOLDINGS, INC., Wilmington, DE (US)

(72) Inventors: Lei Wang, San Diego, CA (US); Eldad M. Zeira, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/447,781

(22) Filed: Jul. 31, 2014

(65) Prior Publication Data

US 2014/0341156 A1 Nov. 20, 2014

Related U.S. Application Data

(63) Continuation of application No. 12/872,162, filed on Aug. 31, 2010, now Pat. No. 8,824,476.

(60) Provisional application No. 61/238,935, filed on Sep. 1, 2009.

(51) Int. Cl.
| | |
|---|---|
| *H04L 1/18* | (2006.01) |
| *H04L 12/801* | (2013.01) |
| *H04L 29/08* | (2006.01) |

(52) U.S. Cl.
CPC .............. *H04L 1/1829* (2013.01); *H04L 47/34* (2013.01); *H04L 69/324* (2013.01)

(58) Field of Classification Search
CPC ..... H04L 47/34; H04L 1/1812; H04L 69/324; H04L 1/1829

USPC .............. 370/328, 329, 335, 394, 395.4, 447, 370/465–476
See application file for complete search history.

(56) References Cited

U.S. PATENT DOCUMENTS

| 5,847,751 A | 12/1998 | Safadi |
| 7,310,336 B2 | 12/2007 | Malkamaki |

(Continued)

FOREIGN PATENT DOCUMENTS

| EP | 1 755 355 | 2/2007 |
| WO | 2008112137 A1 | 9/2008 |

(Continued)

OTHER PUBLICATIONS

Xu, "Retransmission Mechanism Simplification," IEEE C802.16m-08/640 (Jul. 2008).

(Continued)

*Primary Examiner* — Xavier S. Wong
(74) *Attorney, Agent, or Firm* — Volpe & Koenig, P.C.

(57) ABSTRACT

Method and apparatus for MAC in-order delivery are disclosed. The MAC in-order delivery may be activated per-connection and may be negotiated at connection setup. The MAC in-order delivery may be activated per data flow. The MAC in-order delivery either for non-ARQ connections or ARQ connections may be performed by using HARQ packet ordering information. Alternatively, the MAC in-order delivery may be performed using a sequence number (SN) field at the MAC PDU level or using an SN field at the MAC SDU level. For a connection that has MAC in-order delivery disabled, the MAC PDU may not include an SN field, and an SN field may be included in a MAC extended header or a MAC sub-header when needed. Data packets may be in order before transmission. For a connection that has MAC in-order delivery enabled, data packets can be reordered after reception based on the original data packet ordering.

22 Claims, 10 Drawing Sheets

(56) References Cited

U.S. PATENT DOCUMENTS

| | | | |
|---|---|---|---|
| 7,609,702 | B2 | 10/2009 | Major |
| 8,824,476 | B2 * | 9/2014 | Wang et al. .................. 370/394 |
| 2003/0174675 | A1 | 9/2003 | Willenegger et al. |
| 2005/0022098 | A1 | 1/2005 | Vayanos et al. |
| 2005/0185609 | A1 | 8/2005 | Malkamaki |
| 2006/0007886 | A1 | 1/2006 | Lee et al. |
| 2007/0274342 | A1 | 11/2007 | Kim et al. |
| 2008/0165670 | A1 | 7/2008 | Tao et al. |
| 2008/0165805 | A1 | 7/2008 | Terry et al. |
| 2008/0232316 | A1 * | 9/2008 | Cho et al. ...................... 370/329 |
| 2008/0298332 | A1 | 12/2008 | Erami |
| 2009/0319557 | A1 | 12/2009 | Lipka et al. |
| 2010/0111068 | A1 * | 5/2010 | Wu ............................... 370/345 |
| 2010/0150082 | A1 | 6/2010 | Shin et al. |

FOREIGN PATENT DOCUMENTS

| | | | |
|---|---|---|---|
| WO | 2008115446 | A1 | 9/2008 |
| WO | 2009042849 | A2 | 4/2009 |

OTHER PUBLICATIONS

IEEE Draft Amendment to IEEE Standard for Local and metropolitan area networks Part 16: Air Interface for Broadband Wireless Access Systems Advanced Air InterfaceIEEE P802.16m/D1 (Jul. 2009).

IEEE Draft Amendment to IEEE Standard for Local and metropolitan area networks, "Part 16: Air Interface for Fixed and Mobile Broadband Wireless Access Systems", IEEE P802.16m/D6 (May 2010).

IEEE Standard for Local and metropolitan area networks, "Part 16: Air Interface for Broadband Wireless Access Systems", IEEE 802.16-2009 (Mar. 2009).

Srinivasan et al., IEEE 802.16m System Description Document (SDD), IEEE 802.16 Broadband Wireless Access Working Group (Jul. 27, 2009).

Third Generation Partnership Project,"Technical Specification Group Radio Access Network; Radio Interface Protocol Architecture (Release 8)," 3GPP TS 25.301 V8.5.0 (Mar. 2009).

Third Generation Partnership Project,"Technical Specification Group Radio Access Network; Radio Interface Protocol Architecture (Release 8)," 3GPP TS 25.301 V8.7.0 (Jun. 2010).

Third Generation Partnership Project,"Technical Specification Group Radio Access Network; Radio Interface Protocol Architecture (Release 9)," 3GPP TS 25.301 V9.2.0 (Jun. 2010).

Third Generation Partnership Project,"Technical Specification Group Radio Access Network; Radio Interface Protocol Architecture (Release 7)," 3GPP TS 25.301 V7.5.0 (Jun. 2010).

Third Generation Partnership Project,"Technical Specification Group Radio Access Network; Radio Interface Protocol Architecture (Release 7)," 3GPP TS 25.301 V7.4.0 (Mar. 2008).

* cited by examiner

METHOD AND APPARATUS FOR MEDIUM ACCESS CONTROL IN-ORDER DELIVERY

CROSS REFERENCE TO RELATED APPLICATIONS

This application is a continuation of U.S. patent application Ser. No. 12/872,162 filed Aug. 31, 2010, which claims the benefit of U.S. Provisional Application Ser. No. 61/238,935 filed Sep. 1, 2009, the contents of which are hereby incorporated by reference herein.

BACKGROUND

Data packets received over the air link may be delivered from a medium access control (MAC) layer to an upper layer out-of-order. For example, hybrid automatic repeat request (HARQ) retransmissions, automatic repeat request (ARQ) retransmissions, different processing paths and time for different data packets of the same application due to different per MAC protocol data unit (PDU) operations, (e.g., with or without fragmentation or reassembly, etc.), may cause the data packets delivered to the upper layer out-of-order.

In accordance with the current IEEE 802.16m specifications, a MAC PDU includes a sequence number (SN) field in the data transport connections. However, the SN may be an unnecessary overhead since not every application requires MAC in-order delivery. Even with a SN in a MAC PDU, the MAC service data unit (SDU) in-order delivery may not be guaranteed. After the ARQ operation in a receive processing, de-multiplexing and reassembly functions are performed. MAC PDUs from multiple flows may be multiplexed into the same MAC PDU, and the de-multiplexing function de-multiplexes the MAC PDUs from different flows. MAC SDU fragments may be included in a MAC PDU, and the reassembly function reassembles the SDU fragments to the original MAC SDU. The de-multiplex and reassembly functionalities are either per MAC PDU or per MAC SDU operations. Such per MAC PDU or MAC SDU operations may have different paths or processing time for the MAC PDUs or MAC SDUs in the same connection, possibly resulting in an out-of-order delivery.

SUMMARY

A method and an apparatus for MAC in-order delivery are disclosed. The MAC in-order delivery may be activated per-connection and may be negotiated at connection setup. The MAC in-order delivery either for non-ARQ connections or ARQ connections may be performed by using HARQ packet ordering information. Alternatively, the MAC in-order delivery may be performed using an SN field at the MAC PDU level or using an SN field at the MAC SDU level. For a connection that has MAC in-order delivery disabled, the MAC PDU may not include an SN field, and an SN field may be included in a MAC extended header or a MAC sub-header when needed.

BRIEF DESCRIPTION OF THE DRAWINGS

A more detailed understanding may be had from the following description, given by way of example in conjunction with the accompanying drawings wherein.

DETAILED DESCRIPTION

Embodiments for MAC in-order delivery with a minimum overhead are explained hereafter. It should be noted that the embodiments will be explained with reference to IEEE 802.16m standards as an example, and the embodiments disclosed herein are applicable to any wireless communication systems including, but not limited to, IEEE 802.16, 802.16m, third generation partnership project (3GPP) long term evolution (LTE), LTE-Advanced, high speed packet access (HSPA), HSPA+, CDMA2000, and the like.

Figure 1A:
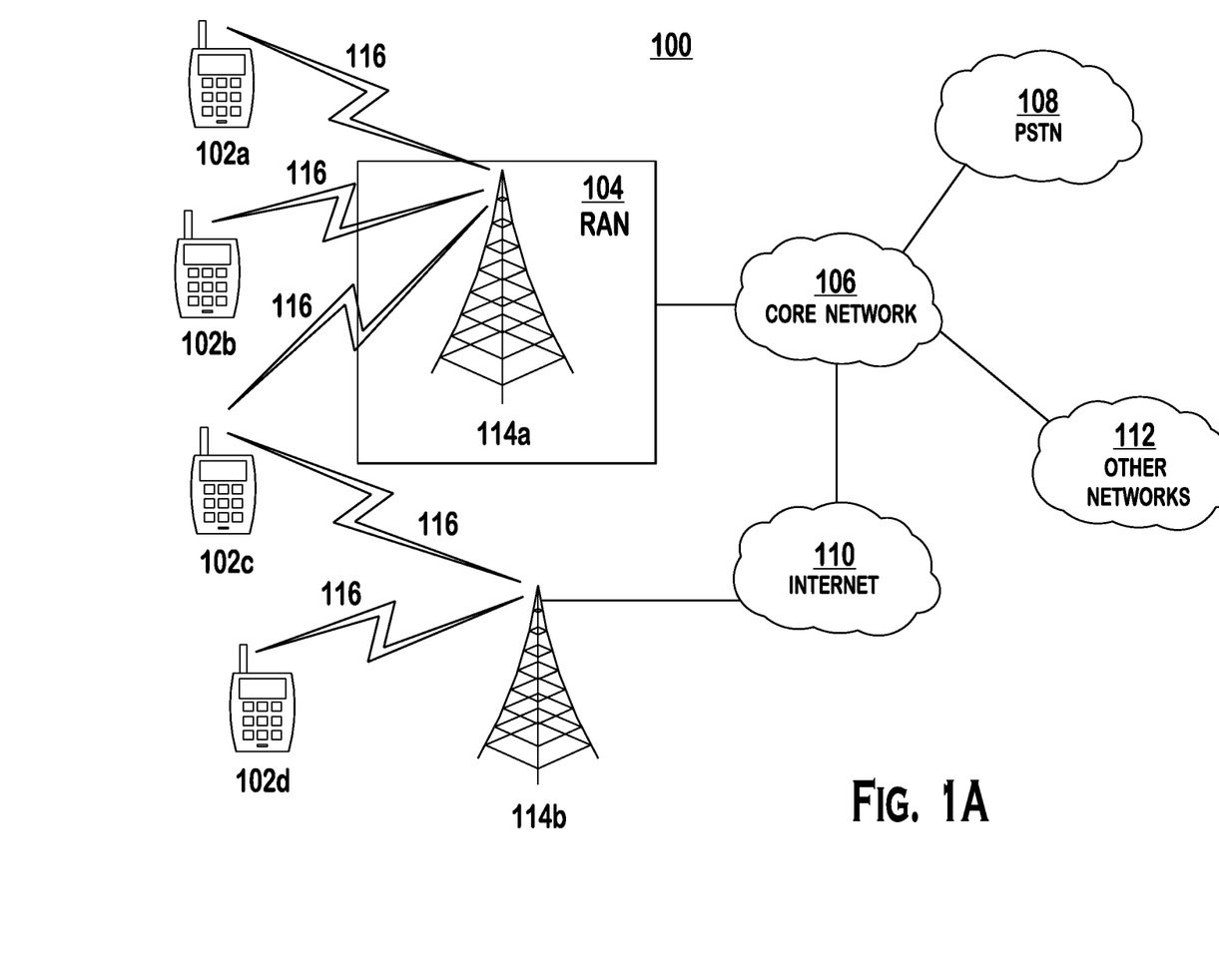
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
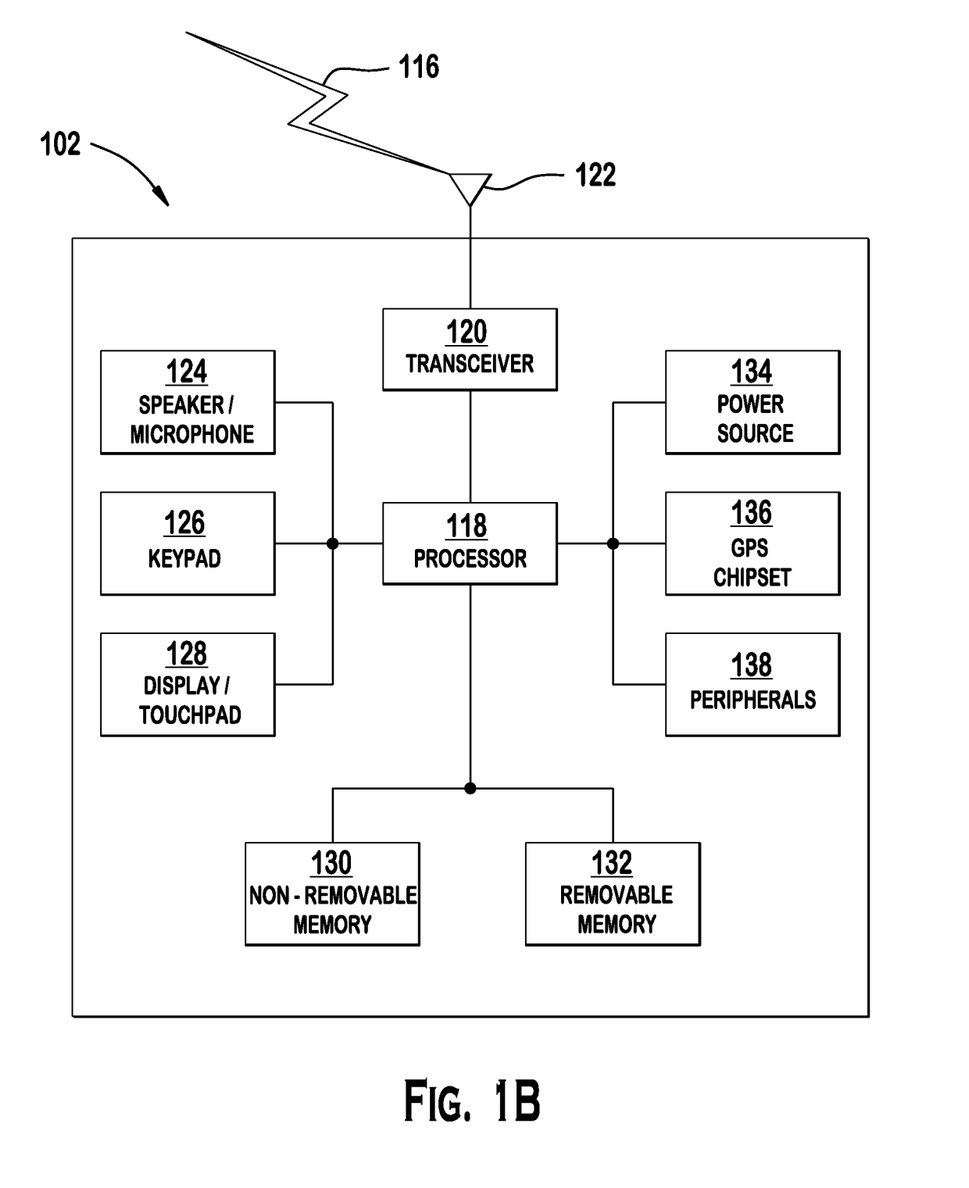
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
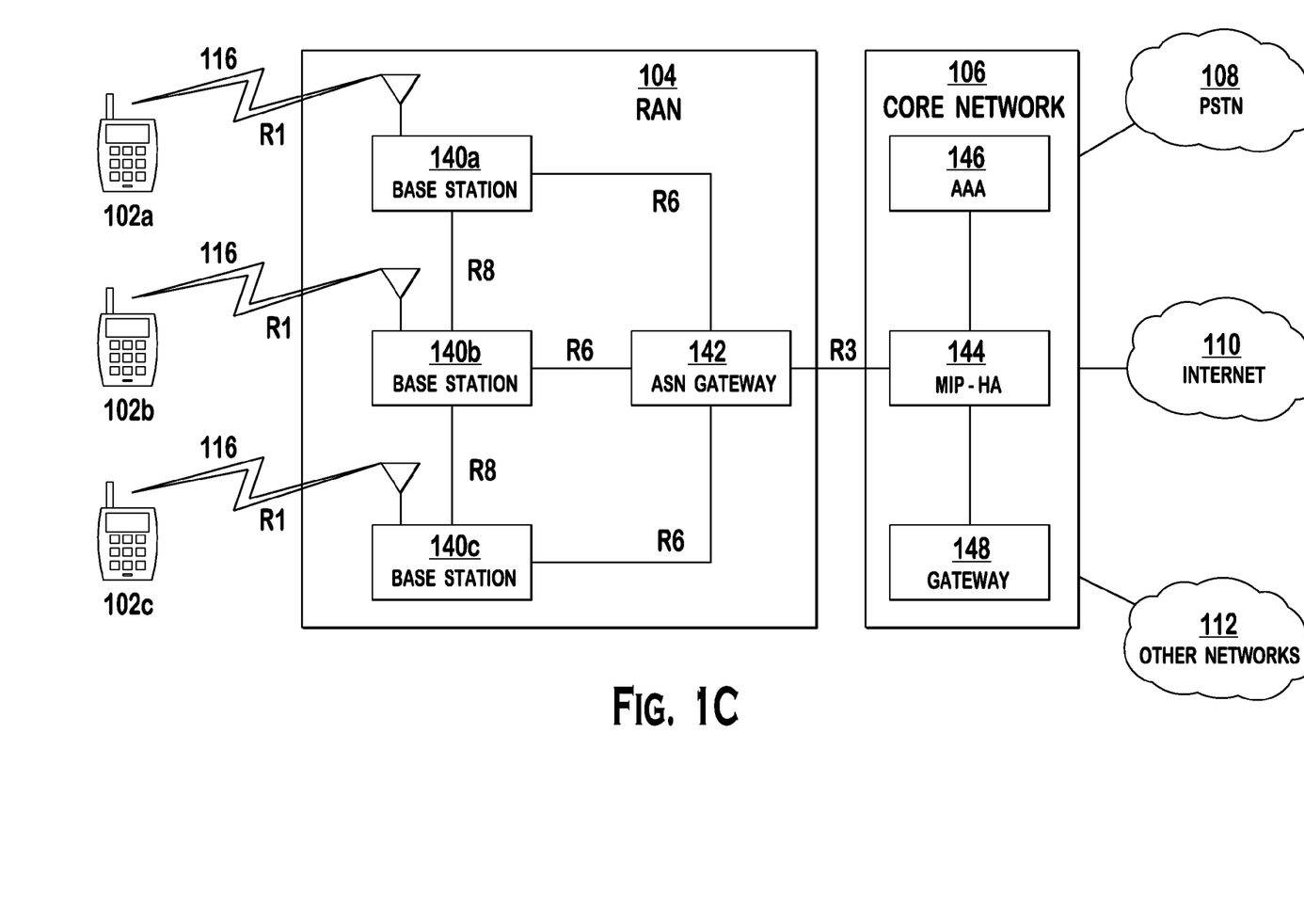
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

In accordance with one embodiment, the MAC in-order delivery may be activated per-connection, (i.e., per-flow at MAC layer), and may be negotiated, (i.e., enabled or disabled), at connection setup. Connection-specific MAC PDU formats, including different MAC headers, sub-headers, and extended headers, and other fields for different types of connections, may be provided.

The MAC in-order delivery (either for non-ARQ connections or ARQ connections) may be achieved by using HARQ packet ordering information, (e.g., HARQ channel identity), using an SN field at the MAC PDU level, (e.g., an SN field in the MAC header, the MAC subheader, or the MAC extended header), or using an SN field at the MAC SDU level, (e.g., an SN field in a convergence sublayer PDU).

For a connection that has MAC in-order delivery disabled, the MAC PDU may not need an SN field, and an SN field may be included in a MAC extended header or a MAC sub-header when needed, (e.g., for fragmentation or reassembly, ARQ, etc.). This will minimize the MAC overhead, (i.e., MAC headers, subheaders, and extended headers).

Figure 2A:
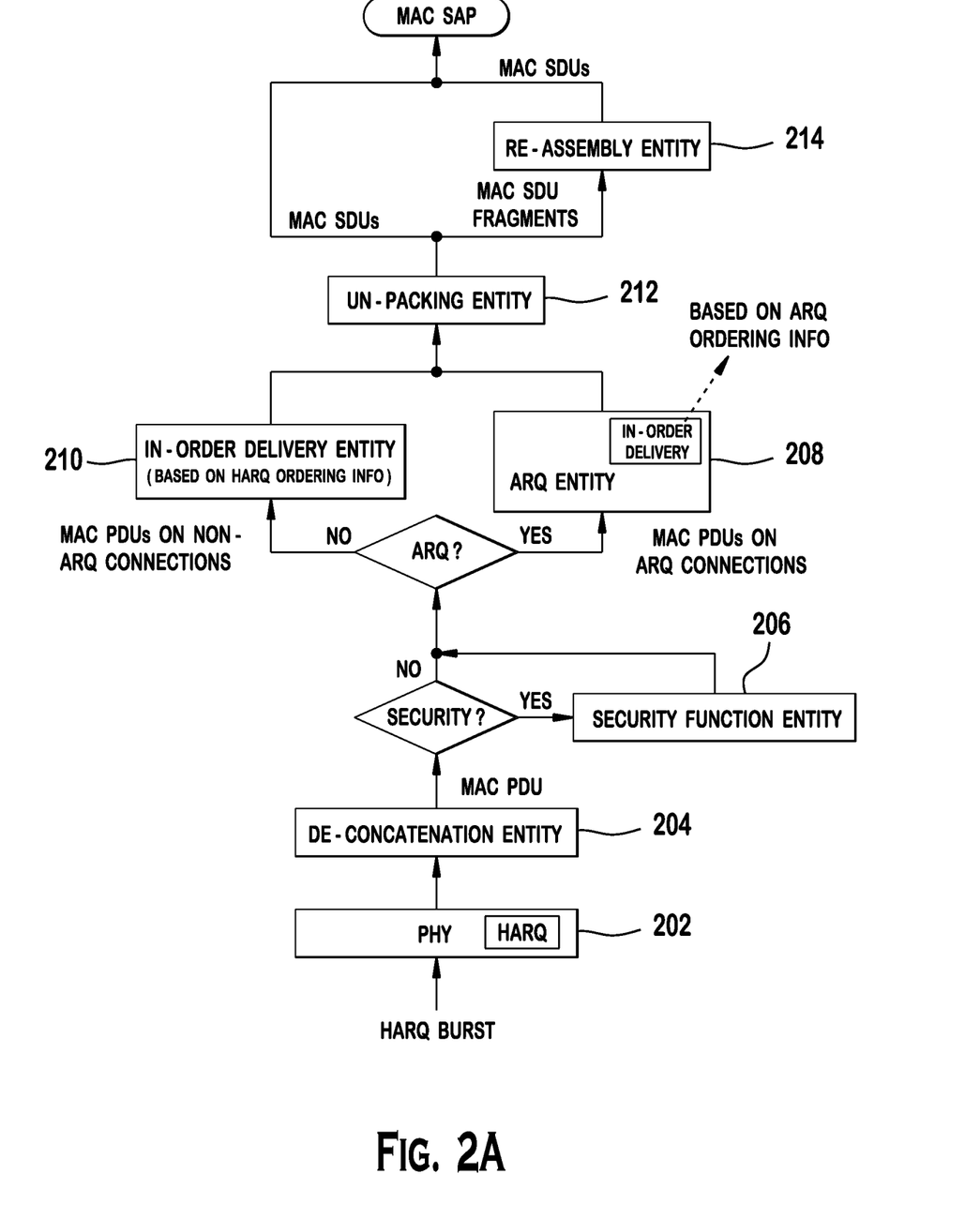
FIG. 2A shows example processing of MAC in-order delivery for non-ARQ connections at a receiving side using HARQ packet ordering information.

An embodiment for MAC in-order delivery using HARQ packet ordering information is explained. FIG. 2A shows example processing of MAC in-order delivery for a non-ARQ connection at a receiving side using HARQ packet ordering information. Physical bursts, (i.e., HARQ packets), are received at the physical layer 202. With the HARQ incremental redundancy (IR), a HARQ packet may be encoded into different subpackets, (i.e., transmission and retransmissions of the HARQ packet may carry different subpackets). The use of subpackets does not change the MAC in-order delivery operation using the HARQ packet ordering information. Therefore, for simplicity, the embodiments below will be described without distinguishing the subpackets in the HARQ IR retransmissions.

One or more MAC PDUs may be concatenated in the same physical burst. The MAC PDUs included in the same HARQ packet are de-concatenated by the de-concatenation entity 204. After de-concatenation, the MAC PDUs with security enabled are processed by the security function entity 206; otherwise, the security function is bypassed. After security checking, the MAC PDUs on an ARQ connection are processed by the ARQ entity 208 for ARQ operation, (i.e., missing MAC PDUs are identified based on an SN, and ARQ feedback is sent to a transmitting side for automatic retransmission operation). The MAC PDUs on the ARQ connection may be reordered based on the MAC PDU SN in accordance with another embodiment, which will be explained below. For the non-ARQ connection, the MAC PDUs are reordered by the in-order delivery entity 210 based on the HARQ packet ordering information and delivered to the next processing entity in a receiver processing path, (i.e. an unpacking entity 212).

Figure 2B:
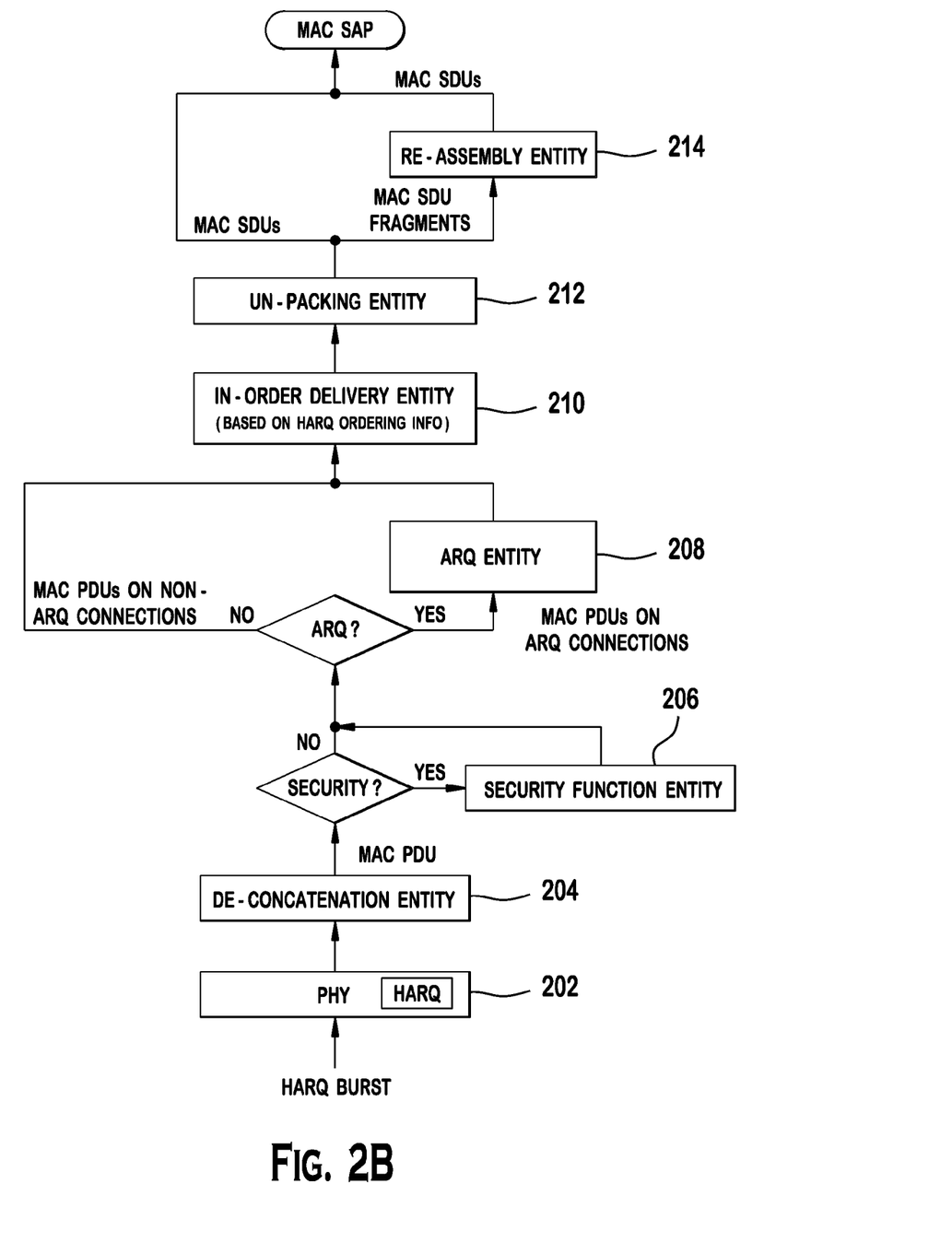
FIG. 2B shows example processing of MAC in-order delivery for both ARQ and non-ARQ connections at a receiving side using HARQ packet ordering information.

As an alternative embodiment, FIG. 2B shows example processing of MAC in-order delivery at a receiving side using HARQ packet ordering information for both ARQ and non-ARQ connections. As shown in FIG. 2B, the MAC in-order delivery may be performed based on the HARQ packet ordering information for the MAC PDUs on the ARQ connection. In FIG. 2B, the in-order delivery functionality is performed after the ARQ entity 208 so that the MAC PDUs may be reordered based on the HARQ packet ordering information. The example of the MAC PDU reordering based on the HARQ packet ordering information will be explained in detail with reference to FIGS. 3 and 4.

The MAC PDUs come out in-order from the in-order delivery entity 210 for non-ARQ connections and from the ARQ entity 208 for ARQ connections as shown in FIG. 2A. Alternatively, the MAC PDUs come out in-order from the in-order delivery entity 210 for both ARQ and non-ARQ connections as shown in FIG. 2B. MAC PDUs with MAC SDUs or SDU fragments from the same connection are forwarded to the unpacking entity 212. The unpacking entity 212 abstracts out the MAC SDUs or SDU fragments from the MAC PDUs. SDU fragments are reassembled to a MAC SDU by the reassembly entity 214. MAC SDUs are then delivered to an upper layer in the unpacking order. The unpacking entity 212 works with the reassembly entity 214 to ensure that the MAC SDUs are delivered in the same order as the corresponding MAC PDUs are received at the unpacking entity 212.

Figure 3:
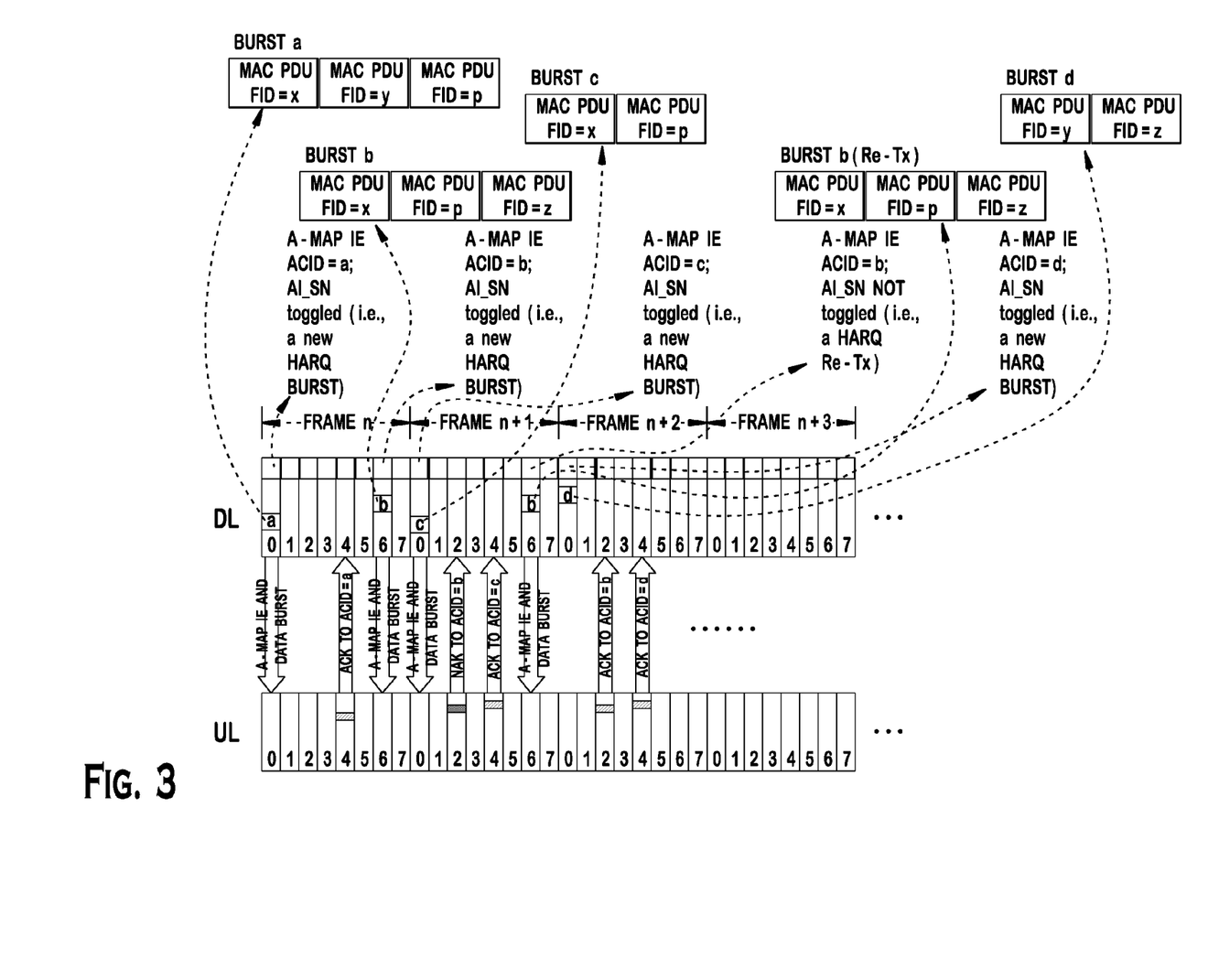
FIG. 3 shows an example downlink (DL) HARQ transmission and retransmission and using the HARQ burst ordering information for MAC in-order delivery.

FIG. 3 shows an example downlink (DL) HARQ transmission and retransmission and using the HARQ packet ordering information for MAC in-order delivery. In the 802.16m standards, a resource for the HARQ burst transmission is allocated by an advanced map (A-MAP) information element (IE). The A-MAP IE is transmitted in the DL control channel. A WTRU (e.g., mobile station) receives an A-MAP IE and then processes the corresponding HARQ packet in the same subframe. The A-MAP IE may include a 4-bit HARQ channel ID (ACID) and a 1-bit HARQ burst sequence number (AI_SN). If the AI_SN is toggled compared to the last received HARQ burst with the same ACID, it indicates that the HARQ packet is a new HARQ packet; otherwise, it indicates that the HARQ packet is a retransmission of the previous HARQ packet.

In the example of FIG. 3, an A-MAP IE and burst-a are transmitted in subframe 0 of frame n. The burst-a includes three MAC PDUs with flow IDs (FIDs) x, y and p, respectively. The A-MAP IE includes ACID=a and AI_SN toggled indicating that it is a new HARQ burst. The burst-a is successfully decoded and a mobile station sends a positive acknowledgement (ACK) to ACID=a to the base station. An A-MAP IE and burst-b are sent in subframe 6 of frame n. The burst-b includes three MAC PDUs with FIDs x, p, and z, respectively. The A-MAP IE includes ACID=b and AI_SN toggled indicating that it is a new HARQ burst. The burst-b is not successfully decoded, and the mobile station sends a negative acknowledgement (NACK) to ACID=b. An A-MAP IE and burst-c are transmitted in subframe 0 of frame n+1. The burst-c includes two MAC PDUs with FIDs x and p, respectively. The A-MAP IE includes ACID=c and AI_SN toggled indicating that it is a new HARQ burst. The burst-c is correctly decoded and the mobile station sends an ACK to ACID=c. The burst-b is retransmitted in subframe 6 of frame n+1. The A-MAP IE includes ACID=b and AI_SN not toggled indicating that it is a retransmitted HARQ burst. The retransmitted burst-b is successfully decoded and the mobile stations sends an ACK to ACID=b. An A-MAP IE and burst-d are transmitted in subframe 0 of frame n+2. The burst-d includes two MAC PDUs with FIDs y and z, respectively. The A-MAP IE includes ACID=d and AI_SN toggled indicating that it is a new HARQ burst. The burst-d is correctly decoded and the mobile station sends an ACK to ACID=d.

For the MAC in-order delivery using the HARQ packet ordering information, multiple receiver-side "internal" sequence numbers may be used to map the HARQ packet ordering information to the internal MAC sequence numbers. The internal sequence numbers are referenced in the receiver side for the receive processing of the MAC PDUs, and is not communicated with the transmit side. At the reception of the A-MAP IE, a WTRU assigns a receiver-side internal burst SN (RI-BSN) to the corresponding HARQ burst based on the receiving order of the A-MAP IE. The HARQ burst may be identified by the ACID and the AI_SN given in the A-MAP IE. The RI-BSNs may be numerically in order, (e.g., i, i+1, i+2, . . . ), while the ACIDs are not necessarily in a numeric order. The RI-BSN may be a per-station sequence number.

Figure 4:
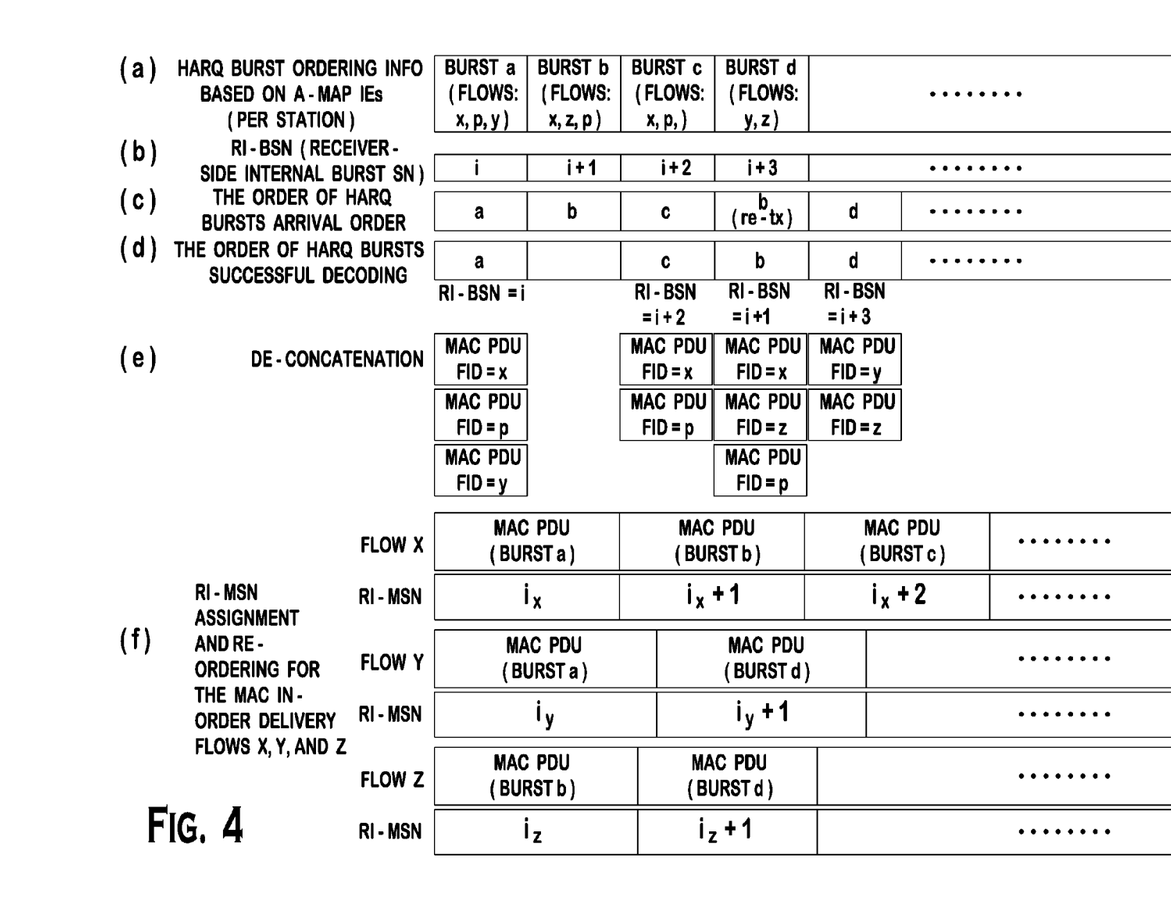
FIG. 4 shows example receive side processing of mapping the HARQ burst ordering information to the internal MAC sequence numbers for the HARQ bursts of FIG. 3.

FIG. 4 shows example receive side processing of mapping the HARQ packet ordering information to the internal MAC sequence numbers for the HARQ bursts of FIG. 3. The order of HARQ bursts based on the received A-MAP IE is bursts a, b, c, and d as shown in FIG. 4(a). The WTRU assigns the RI-BSNs to the HARQ bursts in that order as shown in FIG. 4(b), (i.e., RI-BSN i to burst-a, RI-BSN i+1 to burst-b, RI-BSN i+2 to burst-c, and RI-BSN i+3 to burst-d).

After successfully receiving a HARQ burst (either initial transmission or retransmission), the HARQ burst is de-concatenated, (i.e., the MAC PDUs included in the HARQ burst are abstracted out). The de-concatenation order may be the same as the order of successfully decoded HARQ bursts, but which may not be the same as the HARQ packet arrival order. For example, in FIG. 4, burst-c may be de-concatenated before burst-b. FIGS. 4(c) and 4(d) show the HARQ bursts arrival order and successful decoding order. The WTRU determines which HARQ burst is out-of-order based on the associated RI-BSN.

FIG. 4(e) shows the de-concatenated MAC PDUs, which may be forwarded from the de-concatenation entity 204 to the in-order delivery entity 208. When de-concatenating MAC PDUs, the MAC PDUs on the flows not requiring MAC in-order delivery, (e.g., MAC PDUs with FID=p in FIGS. 3 and 4), may be sent to the next processing module on the receive processing path immediately, (e.g., security function entity 206 if enabled), while the MAC PDUs on the flows requiring MAC in-order delivery, (e.g., MAC PDUs with FID=x, y, and z in FIGS. 3 and 4), may be held in a MAC PDU re-ordering buffer together with its associated RI-BSN until all preceding HARQ bursts are either successfully decoded or failed. In this way, the MAC PDUs for a flow requiring MAC in-order delivery are put into the same order as the transmission order, (i.e., in-order delivery).

After the de-concatenation, a receiver-side internal MAC sequence number (RI-MSN) is assigned to each MAC PDU on the flows requiring MAC in-order delivery, which are sent with the MAC PDU to the next processing module on the receiving path. As shown in FIG. 4(f), for flow x, the MAC PDU in burst-a with FID=x is assigned RI-MSN $i_x$, the MAC PDU in burst-b with FID=x is assigned RI-MSN $i_x+1$, and the MAC PDU in burst-c with FID=x is assigned RI-MSN $i_x+2$. For flow y, the MAC PDU in burst-a with FID=y is assigned RI-MSN $i_y$, and the MAC PDU in burst-d with FID=y is assigned RI-MSN $i_y+1$. For flow z, the MAC PDU in burst b with FID=z is assigned RI-MSN $i_z$, and the MAC PDU in burst d with FID=z is assigned RI-MSN $i_z+1$. The RI-MSN may be a per-flow sequence number, and it may be used by other receive processing modules to preserve the MAC PDU delivery order to the upper layers, (e.g., convergence sub-layer).

In the 802.16m, multiple MAC SDUs or SDU fragments from multiple flows may be multiplexed into one MAC PDU (referred to as "multiplexed MAC PDU), as long as those flows have the same security association. When multiplexed, the multiple flows may have different configurations regarding MAC in-order delivery, and the MAC PDU payloads for each multiplexed flows may be abstracted after security processing. Therefore, at the time of de-concatenation, a multiplexed MAC PDU may not have the information to perform the re-ordering processing for the MAC PDU payloads for the multiplexed flows.

Figure 5:
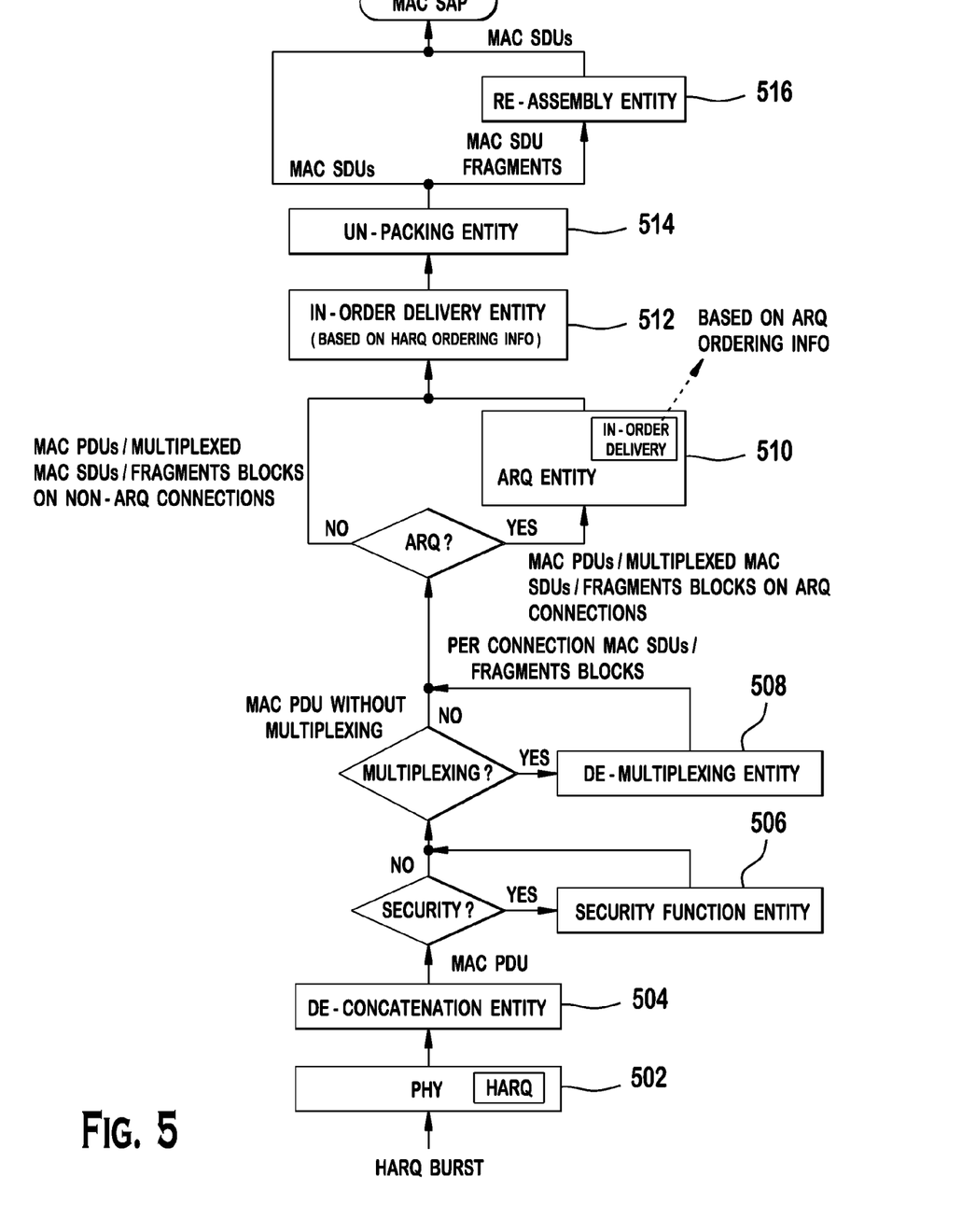
FIG. 5 shows example processing of MAC in-order delivery at a receiving side using HARQ packet ordering information where multiple flows are multiplexed into one MAC PDU.

FIG. 5 shows example processing of MAC in-order delivery at a receiving side using HARQ packet ordering information where multiple flows are multiplexed into one MAC PDU. In accordance with one embodiment, the reordering functionality (i.e., the in-order delivery functionality 512) may be moved after the de-multiplexing entity 508. Physical bursts, (i.e., HARQ packets), are received at the physical layer 502. One or more MAC PDUs may be concatenated into the same physical burst. The MAC PDUs included in the same HARQ packet are de-concatenated by the de-concatenation entity 504. At de-concatenation, each multiplexed MAC PDU on the flows requiring MAC in-order deliver is assigned a receiver-side internal multiplexing sequence number (RI-XS) based on the order of de-concatenation. Since multiple flows are multiplexed into one MAC PDU, the MAC PDUs may not be separated by flow at this stage, (i.e., the MAC SDUs or fragments blocks can be separate after de-multiplexing).

After de-concatenation, the MAC PDUs with security enabled are processed by the security function entity 506; otherwise, the security function is bypassed. After security checking, the MAC PDUs may be processed by the de-multiplexing entity 508 if the multiple connections MAC SDUs/ fragments are multiplexed in the MAC PDUs. At de-multiplexing, each per-connection MAC SDUs/fragments block is abstracted from the MAC PDU and is assigned a receiver-side internal per-flow payload sequence number (RI-PSN).

After de-multiplexing, the MAC PDUs and the multiplexed per-connection MAC SDUs/fragments blocks on an ARQ connection are processed by the ARQ entity 506 for ARQ operation, (i.e., missing MAC PDUs or multiplexed per-connection blocks are identified based on an SN and ARQ feedback is sent to a transmitting side for automatic retransmission operation). The MAC PDUs and the multiplexed per-connect MAC SDUs/fragments blocks on the ARQ connection may be reordered based on the MAC PDU SN. Alternatively, the MAC in-order delivery on the ARQ connections may also be performed with the HARQ ordering information in the RI-BSN, the RI-XSN, and the RI-PSN.

The in-order delivery entity 512 reorders the per-connection MAC PDUs and multiplexed SDUs/fragments blocks in-order based on the RI-BSN, the RI-XSN, and the RI-PSN. The MAC PDUs and multiplexed SDUs/fragments blocks are forwarded to the unpacking entity 514, which abstracts out the MAC SDUs or SDU fragments from the MAC PDUs and multiplexed per-connection MAC SDUs/fragments blocks. SDU fragments are reassembled to a MAC SDU by the re-assembly entity 516. MAC SDUs are then delivered to an upper layer in the unpacking order. The unpacking entity 514 works with the reassembly entity 516 to ensure that the MAC SDUs are delivered in the same order as the corresponding per-connection MAC SDUs/fragments blocks are received at the unpacking entity 514.

The MAC PDU without multiplexing may be considered as a special case of multiplexing, (i.e., multiplexing the payloads on one flow), and the above two processing of FIGS. 2A and 5 may be combined, (i.e., the processing in FIG. 5 may be modified for both multiplexed MAC PDUs and non-multiplexed MAC PDUs). More particularly, the de-concatenation entity 504 sends the triplets (MAC PDU, RI-BSN, RI-XSN) to the next processing module on the receiving path after de-concatenating the MAC PDUs. The de-multiplexing entity 508 uses the RI-BSN and RI-XSN to detect the out-of-order MAC PDU per-flow payloads, performs necessary re-ordering, and assigns the RI-PSN to the MAC PDU per-flow payload. The in-order delivery entity 512 reorders the MAC PDU or the per-flow MAC SDUs/fragments blocks with the RI-PSN. The MAC PDUs without multiplexing are also sent to the de-multiplexing entity 508, as they are treated as a special case of the multiplexing.

In accordance with current 802.16m specifications, a WTRU may have multiple unicast allocations in a subframe. When a WTRU has multiple unicast allocations in a subframe, the order of A-MAP IEs may be different from the order of the bursts being received at the WTRU, because all the bursts will be in the same subframe in time-domain, and the order of the burst reception may depend on the receive processing. The receive processing for the A-MAP IEs and the unicast data bursts may not result in the same reception order. Therefore, the A-MAP IE reception order may not be used as the HARQ burst reception order.

In accordance with one embodiment, the reception order of the HARQ burst transmission, not including the retransmissions, may be used to assign the RI-BSN, where a HARQ burst is still identified by the ACID and AS_SN fields in the A-MAP IE. It is assumed that the data abstraction procedure, (i.e., abstracting data from the HARQ bursts at the HARQ receiver side), will preserve the order of the data mapping procedure, (i.e., putting the data into HARQ bursts at HARQ transmitter side). The RI-BSN is assigned to each new HARQ burst identified by the ACID and toggled AI_SN, whether or not the new HARQ burst is successfully decoded. In this way, the RI-BSN may represent the HARQ burst transmission order.

Figure 6:
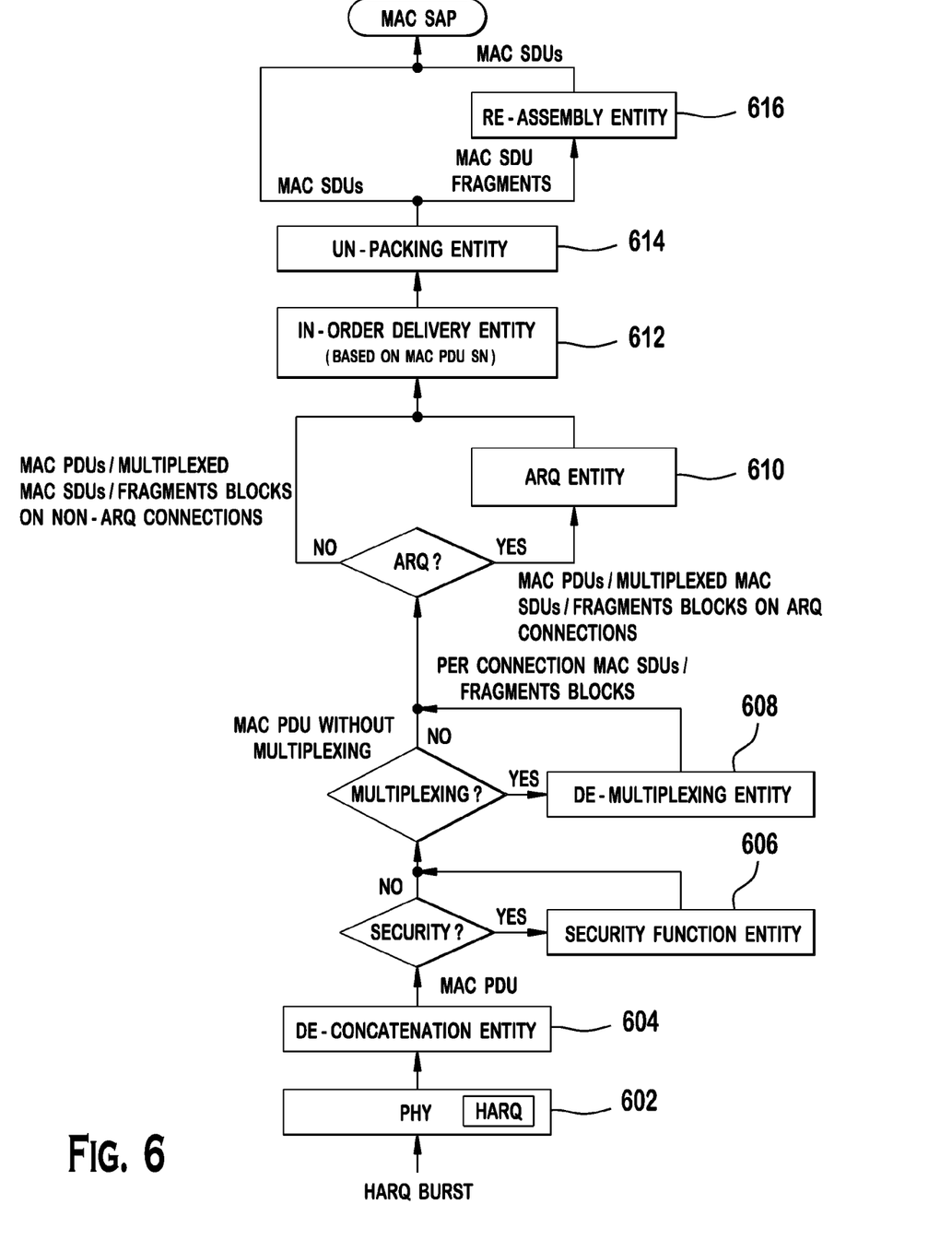
FIG. 6 shows example MAC in-order delivery based on MAC PDU SN in accordance with another embodiment.

FIG. 6 shows an example MAC in-order delivery based on the MAC PDU SN in accordance with another embodiment. If a MAC PDU level SN is used for MAC in-order delivery for a MAC connection (either an ARQ connection or a non-ARQ connection), each MAC PDU may have an SN field, which may be in either the MAC header or the MAC extended header.

Physical bursts, (i.e., HARQ packets), are received at the physical layer 602. One or more MAC PDUs may be concatenated in the same physical burst. The MAC PDUs included in the same HARQ packet are de-concatenated by the de-concatenation entity 604. After de-concatenation, the MAC PDUs with security enabled are processed by the security function entity 606; otherwise, the security function is bypassed. After security checking, the MAC PDUs with multiple blocks of MAC SDUs or SDU fragments from multiple connections are de-multiplexed into per-connection MAC SDUs/fragments blocks by the de-multiplexing entity 608. The MAC PDUs and multiplexed per-connection MAC SDUs/fragments blocks on an ARQ connection are processed by the ARQ entity 610 for ARQ operation, (i.e., missing MAC PDUs and per-connection MAC SDUs/fragments blocks are identified based on an SN, and acknowledgement (ACK) feedback is sent to a transmitting side for automatic retransmission operation). MAC PDUs after the ARQ processing or MAC PDUs on the non-ARQ connection are forwarded to the next processing entity in a receive processing path, i.e., an in-order delivery entity 612. The in-order delivery entity 612 reorders the MAC PDUs or per-connection MAC SDUs/fragments blocks based on the MAC PDU SN.

The unpacking entity 614 abstracts out the MAC SDUs or SDU fragments from the MAC PDUs or the per-connection MAC SDUs/fragments blocks. SDU fragments are reassembled to a MAC SDU by the re-assembly entity 616. MAC SDUs are then delivered to an upper layer in the unpacking order. The unpacking entity 614 works with the reassembly entity 616 to ensure that the MAC SDUs are delivered in the same order as the corresponding MAC PDUs are received at the unpacking entity 614.

Figure 7:
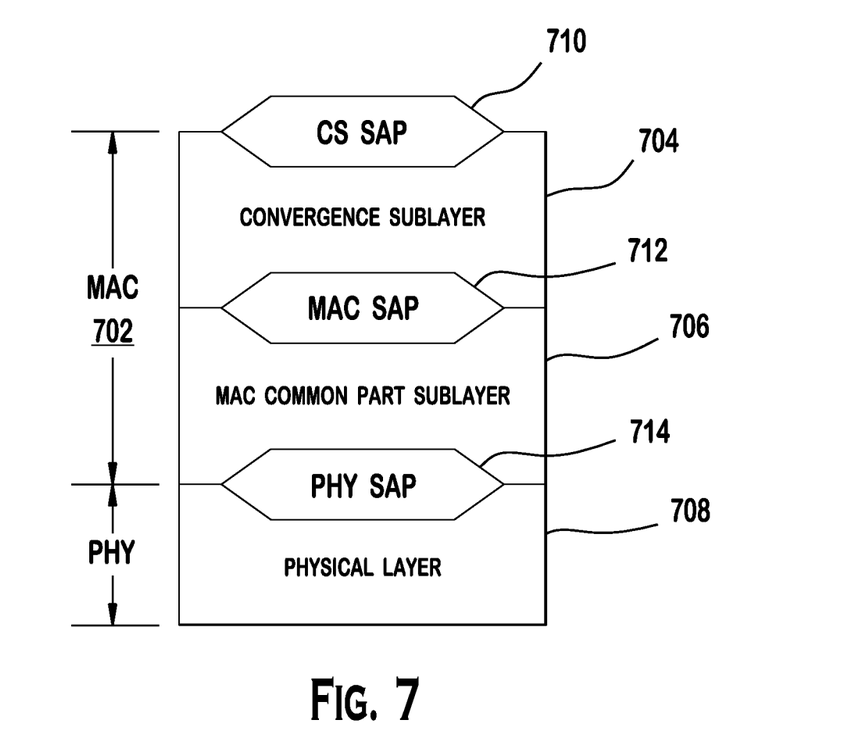
FIG. 7 shows example protocol layers for an 802.16 system.

In accordance with another embodiment, a MAC SDU level SN may be used to achieve the MAC in-order delivery of a MAC connection, (either an ARQ or a non-ARQ connection). FIG. 7 shows example protocol layers for an 802.16 system. Shown in FIG. 7 are a physical layer 708 and a MAC layer 702. The MAC layer 702 may comprise a convergence sublayer (CS) 704 and a MAC common part sublayer 706. The CS 704 provides any transformation or mapping of external network data into MAC SDUs, which are received by the MAC common part sublayer 706 via a MAC service access point (SAP) 712. Also shown in FIG. 7 are a CS SAP 710 and a physical SAP 714. The MAC common part sublayer 706 provides core MAC functionalities including the in-order delivery to the CS 704.

Figure 8:
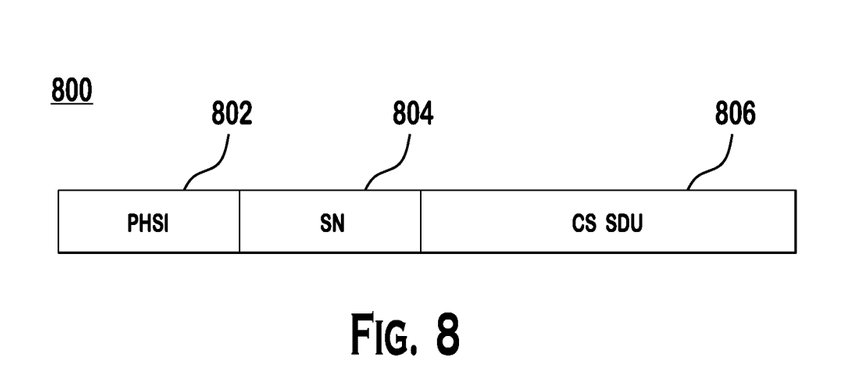
FIG. 8 shows an example MAC SDU format.

In accordance with one embodiment, an SN field 804 may be added in the MAC SDU 800. FIG. 8 shows an example MAC SDU 800. The MAC SDU may comprise payload header suppression index (PHSI) 802, SN 804, and CS SDU fields 806. The SN 802 may be per-connection. The CS 704 may perform necessary functions to ensure the in-order delivery of CS SDUs based on the MAC SDU level SN 804.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for medium access control (MAC) in-order delivery, the method comprising:
   receiving a plurality of MAC protocol data units (PDUs), wherein each MAC PDU includes a plurality of data packets, each of the plurality of data packets corresponding to one of a plurality of data flows; and
   delivering the plurality of data packets included in the plurality of MAC PDUs to an upper layer by a MAC entity, wherein each of the plurality of data packets are delivered to the upper layer in sequence order on a condition that MAC in-order delivery is activated for a corresponding one of the plurality of data flows, and wherein the MAC in-order delivery is activated independently for each of the plurality of data flows.

2. The method of claim 1, wherein the plurality of MAC PDUs are received in a plurality of hybrid automatic repeat request (HARQ) bursts and the plurality of data packets are reordered based on HARQ packet ordering information.

3. The method of claim 2, further comprising:
   assigning to each HARQ burst a receiver internal burst sequence number based on an order of reception of resource assignment information for the HARQ bursts; and
   assigning to each MAC PDU a receiver internal MAC sequence number, wherein the plurality of data packets are delivered in sequence order based on the receiver internal burst sequence number and the receiver internal MAC sequence number.

4. The method of claim 3, wherein the receiver internal MAC sequence number is assigned to the MAC PDUs after the MAC PDUs are de-concatenated from the HARQ bursts.

5. The method of claim 2, further comprising:
   assigning to each HARQ burst a receiver internal burst sequence number based on an order of reception of resource assignment information for the HARQ burst;
   assigning to each MAC PDU a receiver internal multiplexing MAC sequence number;
   de-multiplexing per-connection MAC service data units (SDUs)/fragments blocks from each MAC PDU; and
   assigning to each per connection MAC SDUs/fragments block a receiver internal per-flow payload sequence number, wherein plurality of data packets are delivered in sequence order based on at least one of the receiver internal burst sequence number, the receiver internal multiplexing MAC sequence number, and the receiver internal per-flow payload sequence number.

6. The method of claim 2, wherein the MAC PDUs do not include a MAC PDU level sequence number.

7. The method of claim 1, wherein the plurality of data packets are reordered based on a MAC PDU level sequence number.

8. The method of claim 1, wherein the plurality of data packets are reordered based on a MAC service data unit (SDU) level sequence number.

9. The method of claim 1, wherein activation of the MAC in-order delivery is negotiated at connection setup.

10. The method of claim 1, wherein the MAC PDUs include a sequence number.

11. The method of claim 1, wherein the plurality of data packets are reordered based on an original data packet ordering before transmission.

12. An apparatus for medium access control (MAC) in-order delivery, the apparatus comprising:
    a receiver configured to receive a plurality of MAC protocol data units (PDUs), wherein each MAC PDU includes a plurality of data packets, each of the plurality of data packets corresponding to one of a plurality of data flows; and
    a MAC entity configured to deliver the plurality of data packets included in the plurality of MAC PDUs to an upper layer, wherein each of the plurality of data packets are delivered to the upper layer in sequence order on a condition that MAC in-order delivery is activated for a corresponding one of the plurality of data flows, and wherein the MAC in-order delivery is activated independently for each of the plurality of data flows.

13. The apparatus of claim 12, wherein the plurality of MAC PDUs are received in a plurality of HARQ bursts and the plurality of data packets are reordered based on HARQ packet ordering information.

14. The apparatus of claim 13, wherein the MAC entity is configured to assign to each HARQ burst a receiver internal burst sequence number based on an order of reception of resource assignment information for the HARQ bursts, assign to each MAC PDU a receiver internal MAC sequence number, and deliver the plurality of data packets in sequence order based on the receiver internal burst sequence number and the receiver internal MAC sequence number.

15. The apparatus of claim 14, wherein the MAC entity is configured to assign the receiver internal MAC sequence number to the MAC PDUs after the MAC PDUs are de-concatenated from the HARQ bursts.

16. The apparatus of claim 13, wherein the MAC entity is configured to assign to each HARQ burst a receiver internal burst sequence number based on an order of reception of resource assignment information for the HARQ bursts, assign to each MAC PDU a receiver internal multiplexing MAC sequence number, de-multiplex per-connection MAC service data units (SDUs)/fragments blocks from each MAC PDU, assign to each per connection MAC SDUs/fragments block a receiver internal per-flow payload sequence number, and deliver the plurality of data packets in sequence order based on at least one of the receiver internal burst sequence number, the receiver internal multiplexing MAC sequence number, and the receiver internal per-flow payload sequence number.

17. The apparatus of claim 13, wherein the MAC PDUs do not include a MAC PDU level sequence number.

18. The apparatus of claim 12, wherein the MAC entity is configured to reorder the plurality of data packets based on a MAC PDU level sequence number.

19. The apparatus of claim 12, wherein the MAC entity is configured to reorder the plurality of data packets based on a MAC service data unit (SDU) level sequence number.

20. The apparatus of claim 12, wherein activation of the MAC in-order delivery is negotiated at connection setup.

21. The apparatus of claim 12, wherein the MAC PDUs include a sequence number.

22. The apparatus of claim 12, wherein the MAC entity is configured to reorder the plurality of data packets based on an original data packet ordering before transmission.

* * * * *